(No Model.)

G. E. HATCH.
SECONDARY BATTERY.

No. 441,413. Patented Nov. 25, 1890.

WITNESSES.
Robert Wallace.
C. E. Nolte

INVENTOR.
George E. Hatch
By Wm. A. Macleod
his Atty

UNITED STATES PATENT OFFICE.

GEORGE E. HATCH, OF CAMBRIDGE, MASSACHUSETTS, ASSIGNOR TO DAVID H. BURRELL, OF LITTLE FALLS, AND JEAN R. STEBBINS, OF WATERTOWN, NEW YORK.

SECONDARY BATTERY.

SPECIFICATION forming part of Letters Patent No. 441,413, dated November 25, 1890.

Application filed February 13, 1890. Serial No. 340,278. (No model.)

*To all whom it may concern:*

Be it known that I, GEORGE E. HATCH, of Cambridge, county of Middlesex, State of Massachusetts, have invented certain new and useful Improvements in Storage-Batteries, of which the following is a specification.

As is well known to those skilled in the art, storage-batteries such as are now commonly used consist of plates of lead set parallel to each other, or substantially so, in a receiver or vessel containing dilute sulphuric acid. These plates of lead or electrodes are either smooth and coated with the active agent of the battery, which is generally what is known commercially as "red lead" and which is the peroxide of lead, or either face of the plate is pierced with holes or has a number of small recesses or depressions in which the red lead is placed as a paste or pigment, and these holes or recesses assist in retaining the red lead in place. In such batteries layers of porous material, such as felt, paper, &c., have been located between the coated leaden plates.

The object of my invention is to construct a storage-battery which shall have all the advantages of these old batteries and in which the thickness and consequent cost of the lead plates may be considerably reduced; and my invention consists in using stiff porous material, honeycombed or provided with holes, pits, grooves, or depressions, as separators and supporters of the metal plates and in applying the active material to the porous plates instead of the lead plates, as has heretofore been the practice.

Figure 1:
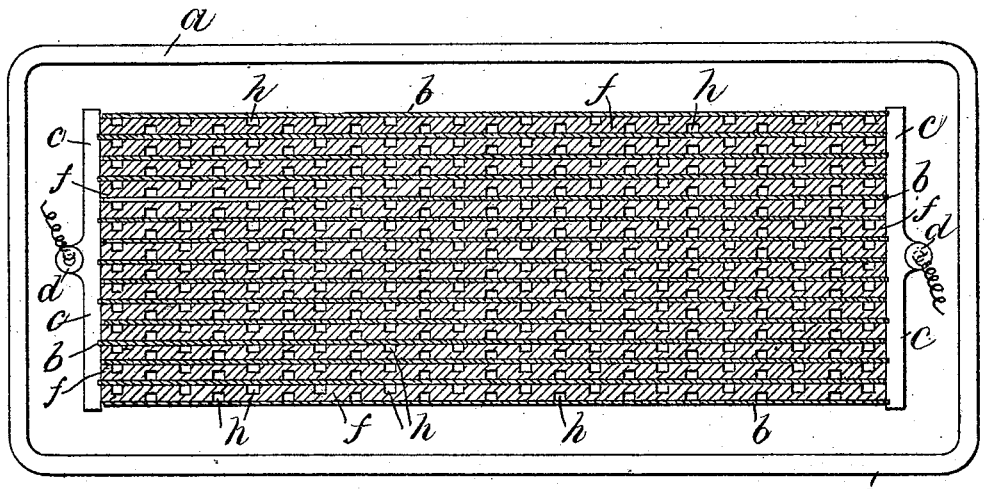
Figures 2, 3:
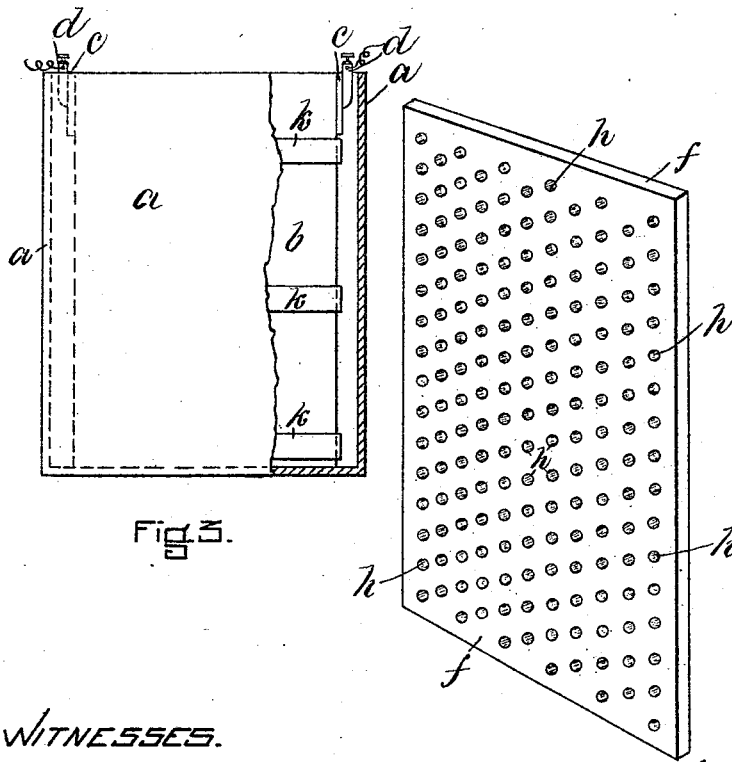

Figure 1 is a horizontal section showing a battery of one cell. Fig. 2 is a perspective of the intermediate plate of porous material. Fig. 3 is an elevation showing a cell in different proportions from those of the other figures, a portion of the receiver being broken away to show the binding rods or strips which secure the plates together.

The receiver or jar is shown at $a$, and may be of any desired shape and of any suitable material.

$b$ are the lead conducting-plates, fifteen of which are shown, that being a desirable number for a single cell. These plates may be very thin, almost lead-foil. The alternate plates are connected by a bar $c$ at either side of the cell, eight plates being connected to one bar and seven to the other, or in any other usual way. A suitable lug $d$ on each bar serves to connect either series of the plates with a wire. Between the lead plates I place a series of porous plates $f$, of earthenware or similar suitable acid-resisting material. These plates are provided on either side, if both sides be used, as will commonly be the case, with a number of recesses $h$, or pits, or the depressions may be in the form of grooves, the recesses on one side alternating preferably with those on the other, and in these recesses I place the active agent of the battery, filling the recesses and preferably coating the whole surface of the intermediate porous plate $f$, so as to insure the contact of the active agent with the lead-plate. If red lead be used, it may be applied either as a paste or in a dry state. If the active material is applied in a dry state, it becomes moist or pasty when the plate is immersed in the liquid of the cell. After the plates are laid together they are preferably bound or clamped so as to hold them securely in position by passing around them bands $k$ of rubber, or they may be secured together by clamps in any well-known manner. As the lead conducting plates or electrodes are securely held in place by the intermediate plates $f$, they cannot warp or twist or come in contact with each other, and as they are not required to support the active agent, they may have smooth surfaces and may be comparatively thin. As the active agent is supported in recesses in the intermediate plates, directly against which the lead plates are placed, the red lead cannot scale or drop off and get out of position, so that while the efficiency of the battery is preserved its durability, compactness, and cheapness are greatly increased. For the best results the intermediate plates $f$ should be of stiff porous material. The porosity of the plates permits the liquid of the cell to thoroughly permeate them, and their stiffness enables them to support the red lead and also to maintain their form when several of the intermediate plates and lead plates are bound or clamped together. As will be clear, the intermediate porous plates need not be absolutely rigid, but they should have sufficient rigidity to prevent the grooves or pits or recesses from being eliminated under pressure and maintain their porosity under some degree of compression. The liquid employed in the cell is that commonly used.

What I claim is—

1. A storage-battery having intermediate plates of stiff porous material alternating with its conducting-plates, substantially as shown and described.

2. A storage-battery consisting of alternate conducting-plates of metal and intermediate plates of earthenware or similar material, to which intermediate plates the active material or agent of the battery is directly applied.

3. A storage-battery consisting of alternate conducting-plates of metal and intermediate plates of earthenware or similar porous material, provided with recesses on either side thereof to receive the active material of the battery, substantially as shown and described.

GEORGE E. HATCH.

Witnesses:
WM. A. MACLEOD,
ROBERT WALLACE.